Sept. 27, 1966  J. B. SELL  3,274,867

MACHINE TOOL APPARATUS

Filed April 30, 1964

United States Patent Office 3,274,867
Patented Sept. 27, 1966

3,274,867
MACHINE TOOL APPARATUS
John Brian Sell, Rugby, England, assignor to The English Electric Company Limited, London, England, a British company
Filed Apr. 30, 1964, Ser. No. 363,961
Claims priority, application Great Britain, May 3, 1963, 11,552/63
1 Claim. (Cl. 82—39)

This invention relates to machine tool apparatus including a machine tool for carrying out machining operations on a workpiece which is turned on a horizontal axis during a machining operation in the machine tool.

According to the invention, such an apparatus includes support means for the workpiece arranged to bear at least part of the weight of the workpiece through a fluid under pressure.

According to a preferred feature of the invention, the support means comprise at least two fluid-pressure operated stays supported on a firm base, each said stay including a support member for supporting at least part of the weight of the workpiece and movable axially with respect to the firm base, and a cylinder assembly operatively connected to the support member, the cylinder assembly comprising a fluid-containing cylinder and a piston arranged for axial movement therein under the influence of pressure in the fluid, whereby the load imposed on the support means by the workpiece can be transmitted through the cylinder assembly to the firm base.

The example of such a firm base is the baseplate of the machine tool.

Preferably, at least two said support members are arranged to engage the workpiece at the same cross-section thereof.

According to another preferred feature of the invention, the cylinders associated with the said support members for engaging the workpiece at the same cross-section thereof are interconnected through fluid duct means which is connected to hydraulic accumulator means, so that fluid can pass into and out of the cylinders while a workpiece of non-uniform contour is being turned in the machine tool, whereby the support members can move axially so as to follow said contours, the accumulator means tending to cause fluid pressure in the cylinders to be maintained at a predetermined value.

According to a further preferred feature of the invention, the cylinders are connected to fluid-pressure relieving means for adjusting the fluid pressure therein progressively during machining of the workpiece, so as to adjust the thrust between the support means and the workpiece. Such relieving means may also act to compensate for wear in the workpiece-engaging portions of the support means.

A fluid-pressure operated stay for apparatus according to the invention is included in the scope of the invention.

Machine tool apparatus in a preferred form according to the invention will now be described by way of example and with reference to the accompanying drawings, of which:

Figure 2:
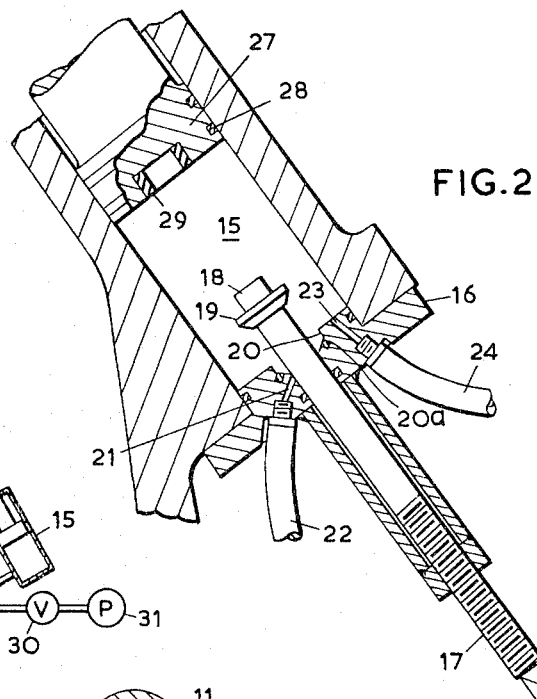
FIG. 2 is a sectional elevation showing in greater detail part of one of the stays shown in FIG. 1.

The lathe includes a headstock and tailstock (not shown), which may be of any known or convenient form; and between the headstock and tailstock there is a flat bedplate 10. The headstock and tailstock are provided with centres which serve to locate a workpiece 11 for rotation and machining in the lathe. Two stay structures 12, which are similar to each other and of which only one is shown in the drawings, are secured to the bedplate 10. The positions of the structures 12 relative to the headstock and tailstock are preferably made so that they can be readily adjusted (by means not shown).

Figure 1:
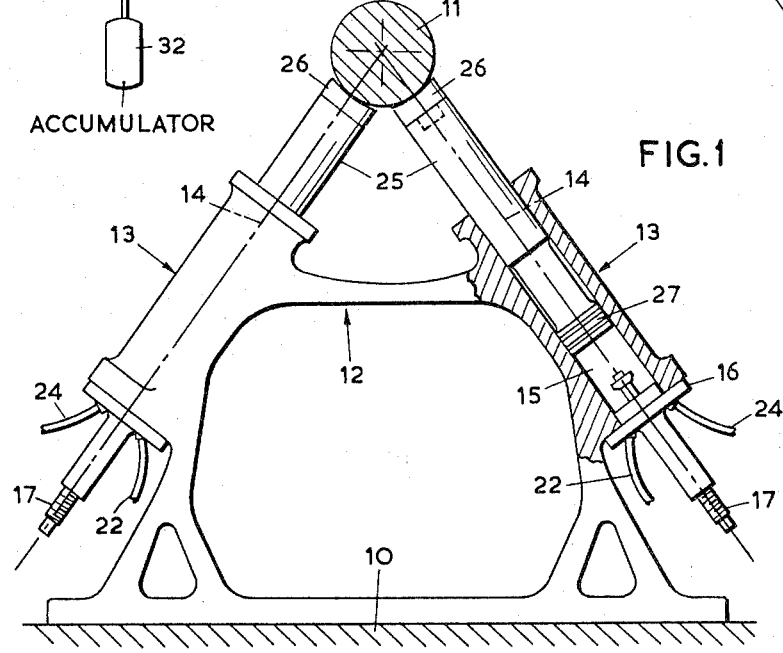
FIG. 1 is a part-sectional elevation showing stays on the bedplate of a lathe, and a workpiece which is partly supported by the stays.

Each structure 12 includes two hydraulic stays 13, each with its centre line 14 inclined at the same angle to the vertical centre plane of the lathe and intersecting the axis of rotation of the workpiece. One stay 13 is shown in part-section in FIG. 1 and in greater detail in FIG. 2, and includes an oil-containing cylinder 15 having a lower end cap 16, through which there projects a jacking screw 17 on the inner end of which is a bearing pad 18, within the cylinder 15. Adjacent the bearing pad 18 is a ring portion 19, having a conical lower surface which engages a corresponding conical seating 20 in the end cap 16.

An oil exhaust duct 21 is connected between the seating 20 and a pipe 22 which leads to an oil sump (not shown). A sealing ring 20A is provided in the seating 20 between the duct 21 and cylinder 15. An oil inlet duct 23 is also provided through the end cap 16, and is connected to an inlet pipe 24, for introducing oil under pressure to the cylinder 15.

A stay post 25, having a bearing pad 26 at its outer end, has a piston 27 formed on its lower end. The stay post 25 is free to move co-axially in the cylinder 15, sealing rings 28 being provided around the circumference of piston 27. The latter also has a seating 29 in its end, for accommodating the bearing pad 18 on the end of the jacking screw 17.

Figure 3:
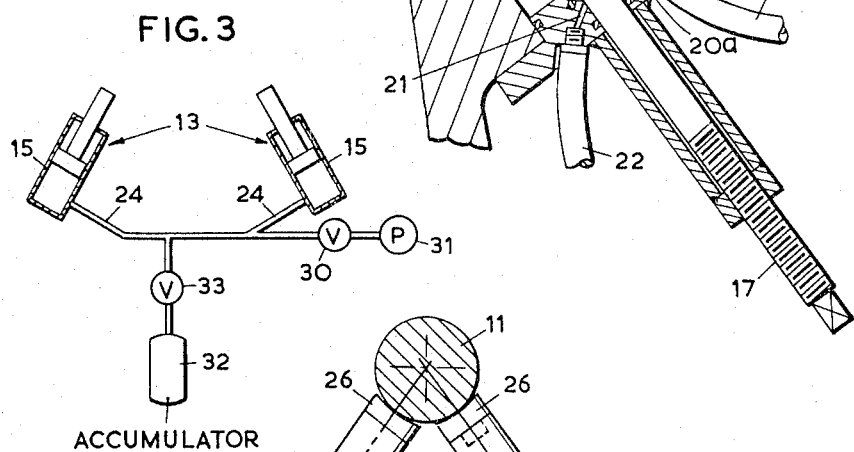
FIG. 3 is a diagram showing essential parts of a hydraulic circuit associated with the stays.

The inlet pipes 24 of the stays are connected in a hydraulic circuit of which the essential part is shown in FIG. 3. The pipes 24 are connected to a fixed displacement pump 31 which supplies oil under pressure through a shut-off valve 30 to the inlet pipes 24, to which a gas-hydraulic accumulator 32 is also connected through a shut-off valve 33. The functions of the circuit are: to supply oil under pressure to the stays; to vary the oil pressure in the cylinders 15 so that the stays can be set to support any predetermined load; and to maintain this pressure within a suitable degree of accuracy for as long as may be required.

In operation, the jacking screw 17 of each stay is first withdrawn away from the piston 27, so that the part-conical face of the ring 19 engages the seating 20 and so co-operates with the seating and with the ring 20A to seal off the cylinder 15 from the exhaust duct 21. The workpiece 11 is then mounted between conical centres on the headstock and tailstock of the machine, in the following way.

The workpiece 11 is first lowered onto the two pairs of stays 13 by suitable tackle (not shown), and the pressure in the cylinders 15 is then adjusted, with the valve 30 open and the valve 33 closed, by operation of the pump 31 so as to raise or lower the stay posts 25 until conical centre holes on the ends of the workpiece 11, not visible in the drawings (one of which holes has previously been made in each end of the workpiece), are opposite the conical centres in the headstock and tailstock. The conical centres are now moved into engagement with the centre holes and the tackle removed. The two pairs of stays 13 now support a substantial proportion of the weight of the workpiece, transmitting this weight through the oil in the cylinders 15 to the bedplate 10 of the lathe. The valve 30 can now be closed and the valve 33 opened.

The workpiece is at first in a rough-turned condition, and the first operation is to turn two reference bands on its surface, one at each end, so as to create cylindrical reference surfaces, concentric with the centres on which the workpiece is being turned.

Any roughness on, or eccentricity of, the surface of the workpiece will cause the stay posts 25 to move axially in the cylinders 15, and this movement causes the volume of oil in the cylinders to vary so that oil tends to pass between the cylinders and the accumulator 32, via the pipes 24. This arrangement ensures that, despite the movement of the stay posts due to surface roughness on the workpiece, the required portion of the weight of the workpiece is still supported by the stay posts 25. The oil pressure in the cylinders 15 tends to urge the stay posts always towards the position in which they were set: the stay posts thus remain in contact with the workpiece. Because most of the weight of the workpiece is taken by the stay posts 25, the conical centres of the headstock and tailstock only have to carry a comparatively small downward load. The centres do, however, control the axial position of the workpiece, thus ensuring that the reference bands are turned concentrically with the centre line defined by the centres.

When the reference bands have been turned, the workpiece is removed from the lathe, and the stay structures 12 are moved along the bedplate 10 until, on replacement of the workpiece in the lathe, the bearing pads 26 engage the reference bands on the workpiece, so that the stays now support the workpiece at circular sections co-axial with the turning centres. The jacking screws 17 are adjusted so that each bearing pad 18 engages the seating 29 in the corresponding piston 27. Since each part-conical face 19 now comes out of contact with its seating 20, the cylinders 15 are brought into communication with the exhaust ducts 21, and manipulation of a relief valve (not shown) in the exhaust pipes releases the oil pressure in the cylinders 15 so that the stay posts 25 are now supported entirely by the jacking screws 17. Replacement and machining of the workpiece can then take place.

The jacking screws 17 need not in fact be provided, since the stays can if desired be arranged so that the stay posts are supported by the oil pressure in the cylinder 15 throughout all the turning operations. In this case, after the reference bands have been turned and the workpiece removed, the accumulator 32 is isolated by closing valve 33. The oil pressure is then brought by the pump 31 to a predetermined value, suitable for enabling the stays to support the desired proportion of the weight of the workpiece, and the valve 30 is then closed.

Hydraulic stays similar in principle to those described may be used not only on a lathe but also on any cylindrical turning or grinding machine—for example facing machines and cylindrical grinders in which the workpiece is supported on a horizontal axis.

The hydraulic circuit may contain a suitable device (such as a relief valve), which may for example be controlled by an electric signal from apparatus responsive to the speed of turning and depth of cut, for progressively adjusting the pressure in the cylinders 15 as turning takes place, so as to compensate for the corresponding progressive reduction in weight of the workpiece.

A suitable device such as a relief valve, for example, may also be incorporated for adjusting the position of the stay posts 25, so as to ensure continuous alignment of the workpiece to compensate for wear in the pads 26.

Stays such as those described are not limited to those in which there are two hydraulic stay posts supporting the workpiece at a given section. A stay incorporating three stay posts, each in its own cylinder, may for example be made. One of the stay posts may act vertically upwards to support most of the weight of the workpiece, the other two engaging the workpiece, one each side, so as to share most of the remainder of the weight between them.

The stay posts 25 may, as an alternative to the arrangement described herein, be fixed to, or integral with, the cylinders 15, in which case the pistons 27 will be fixed with respect to the ground, the cylinder being arranged to move.

The stay structure 12 must be supported on a firm base, which may be the machine tool bedplate as shown; or the structure 12 may be completely separate from the machine tool, supported, either directly on the flood of the building in which the machine tool apparatus is housed or on its own separate bedplate.

What I claim as my invention and desire to secure by Letters Patent is:

Machine tool apparatus including a machine tool for carrying out machining operations on a workpiece which is turned on a horizontal axis during a machining operation in the machine tool, including support means for the workpiece arranged to bear at least part of the weight of the workpiece, said support means comprising two fluid-pressure operated stays supported on a firm base, each said stay including a support member for supporting part of the weight of the workpiece and movable axially with respect to said firm base, and a cylinder assembly operatively connected to the support member, the cylinder assembly comprising a fluid-containing cylinder and a piston arranged for axial movement therein under the influence of pressure in said fluid, and said support members being arranged to engage the workpiece at the same cross-section thereof, wherein said cylinders are interconnected through fluid duct means which is connected to hydraulic accummulator means, so that the fluid can pass into and out of said cylinders while a workpiece of non-uniform contour is being turned in the machine tool, whereby the support members can move axially so as to follow said contour, the accumulator means tending to cause fluid pressure in said cylinders to be maintained at a predetermined value.

References Cited by the Examiner

UNITED STATES PATENTS

| 1,875,486 | 9/1932 | Peaslee | 82—38 X |
| 1,885,233 | 11/1932 | Cole. | |
| 2,441,150 | 5/1948 | Jenkins | 82—39 |
| 2,655,828 | 10/1953 | Hazen | 82—38 |
| 2,737,760 | 3/1956 | Healey | 82—39 X |
| 3,091,985 | 6/1963 | Whalen | 82—38 |

FOREIGN PATENTS

| 525,135 | 5/1931 | Germany. |
| 712,685 | 7/1954 | Great Britain. |

WILLIAM W. DYER, JR., *Primary Examiner.*

L. VLACHOS, *Assistant Examiner.*